(12) United States Patent
Good et al.

(10) Patent No.: US 11,961,202 B1
(45) Date of Patent: Apr. 16, 2024

(54) SYSTEMS AND METHODS FOR EDITING THREE-DIMENSIONAL IMAGE DATA WITH REALISTIC CAMERA AND LENS EFFECTS

(71) Applicant: Illuscio, Inc., Culver City, CA (US)

(72) Inventors: Max Good, Los Angeles, CA (US); Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/453,718

(22) Filed: Aug. 22, 2023

Related U.S. Application Data

(63) Continuation of application No. 18/173,128, filed on Feb. 23, 2023, now Pat. No. 11,769,311.

(51) Int. Cl.
*G06T 19/20* (2011.01)
*G06T 7/50* (2017.01)

(52) U.S. Cl.
CPC ............... *G06T 19/20* (2013.01); *G06T 7/50* (2017.01); *G06T 2207/10028* (2013.01); *G06T 2210/56* (2013.01); *G06T 2219/2004* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 2013/0101175 A1* | 4/2013 | Lynch | G01C 21/3638 382/106 |
| 2016/0028949 A1 | 1/2016 | Lee et al. | |
| 2020/0342652 A1* | 10/2020 | Rowell | G06V 10/82 |
| 2021/0201580 A1* | 7/2021 | Sztuk | G06T 5/002 |
| 2022/0351751 A1 | 11/2022 | Ocean et al. | |

* cited by examiner

*Primary Examiner* — Matthew Salvucci
(74) *Attorney, Agent, or Firm* — Ansari Katiraei LLP; Arman Katiraei; Sadiq Ansari

(57) ABSTRACT

Disclosed is an editing system for postprocessing three-dimensional ("3D") image data to realistically recreate the effects associated with viewing or imaging a represented scene with different camera settings or lenses. The system receives an original image and an edit command with a camera setting or a camera lens. The system associates the selection to multiple image adjustments. The system performs a first of the multiple image adjustments on a first set of 3D image data from the original image in response to the first set of 3D image data satisfying specific positional or non-positional values defined for the first image adjustment, and performs a second of the multiple image adjustments on a second set of 3D image data from the original image in response to the second set of 3D image data satisfying the specific positional or non-positional values defined for the second image adjustment.

19 Claims, 10 Drawing Sheets

SYSTEMS AND METHODS FOR EDITING THREE-DIMENSIONAL IMAGE DATA WITH REALISTIC CAMERA AND LENS EFFECTS

CLAIM OF BENEFIT TO RELATED APPLICATIONS

This application is a continuation of U.S. nonprovisional application Ser. No. 18/173,128 entitled "Systems and Methods for Editing Three-Dimensional Image Data with Realistic Camera and Lens Effects" filed Feb. 23, 2023. The contents of application Ser. No. 18/173,128 are hereby incorporated by reference.

BACKGROUND

The camera sensor, camera settings, and camera lens contribute different effects on the imaging of a scene. For instance, a smaller camera sensor may capture less light and may produce a darker image than a larger camera sensor. The same lens paired with a larger camera sensor produces a shallower depth-of-field ("DOF") than when pairing the same lens with a smaller camera sensor. Also, a DoF created by a large F-stop (e.g., aperture setting) lets in more light, produces a brighter image, and blurs a larger portion of the image than a wide DoF created by a small F-stop. Different lenses diffract light differently onto the camera sensor causing the scene to be captured with different soft and sharp regions (e.g., vignetting), offset lighting, and/or offset coloring.

Although image editing applications allow for the brightness, softness, blurring, and/or other image properties to be adjusted, these adjustments do not realistically generate the camera effects and the lens effects when postprocessing an image because they are applied independent of and without consideration of the camera and lens properties. Moreover, the edits are applied to two-dimensional ("2D") image data that lack depth data which is a primary factor affecting the reproduction of realistic camera and lens effects.

DETAILED DESCRIPTION OF PREFERRED EMBODIMENTS

Figure 1:
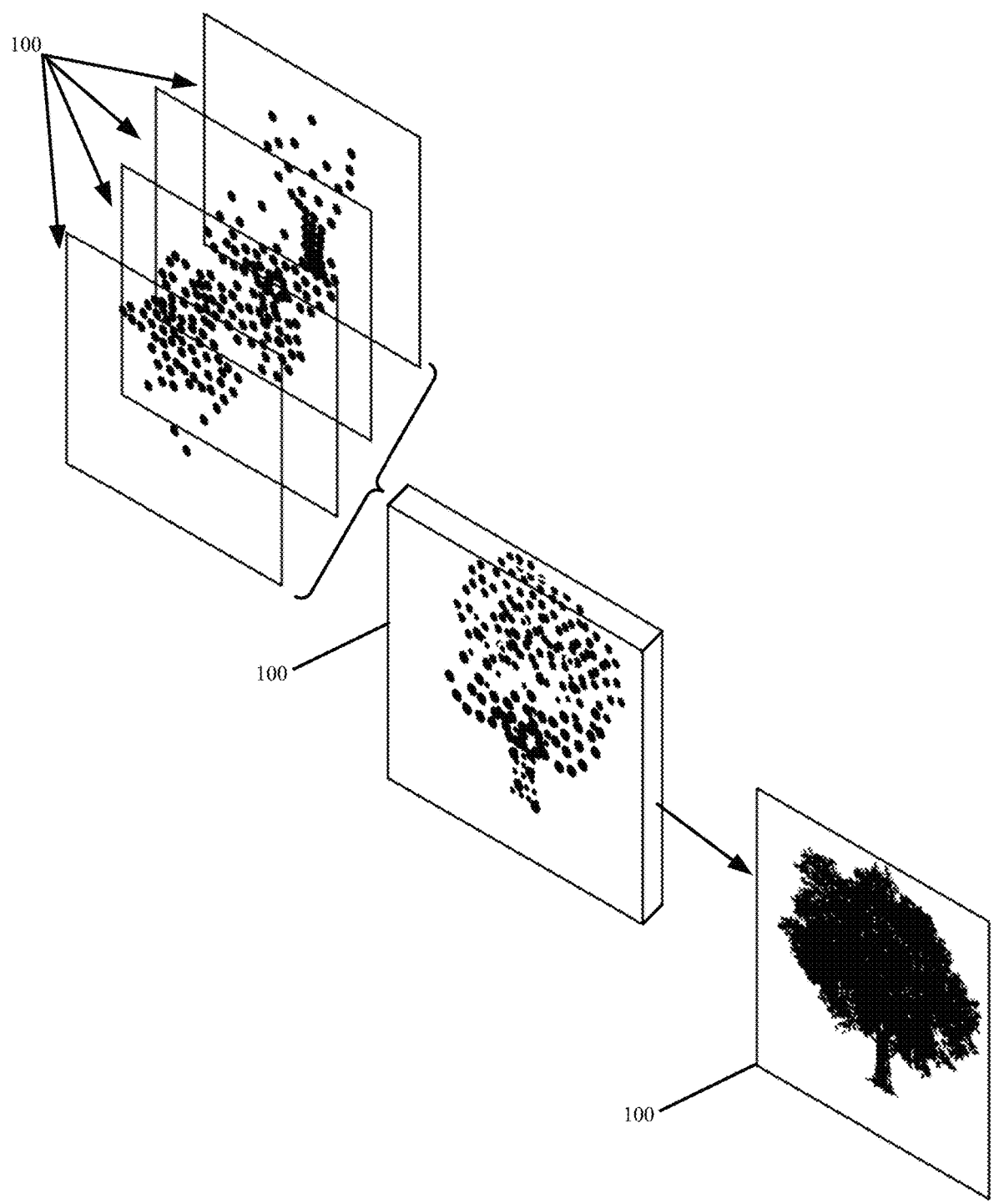
FIG. 1 illustrates an example point cloud with non-uniformly distributed data points, three-dimensional ("3D") constructs, and/or 3D image data in accordance with some embodiments presented herein.

The following detailed description refers to the accompanying drawings. The same reference numbers in different drawings may identify the same or similar elements.

Provided are systems and methods for editing three-dimensional ("3D") image data with realistic camera and lens effects. An editing system provides editing tools for accurately recreating camera and lens effects on 3D image data during postproduction (e.g., image editing), and for rendering the 3D image data with adjustments that present the 3D image data as if it was captured or imaged with specific camera and lens properties that contribute to the applied camera and lens effects.

In some embodiments, the editing system provides one or more tools for accurately recreating the focus (e.g., blurring and/or feathering), lighting, color, and/or other image properties associated with capturing a scene with different camera sensors, F-stop settings (e.g., aperture), shutter speed, ISO, other camera settings, and/or lenses having different refractive properties when postprocessing an image of the scene. The one or more tools allow a user to directly select different camera sensors, and to apply an associated set of two or more adjustments to the image without the user having to manually define the quantity and location at which to apply each of the two or more adjustments in order to recreate the effect of the selected camera setting or lens. The editing system renders the image data at different depths or at different regions of the image with automatically adjusted focus, lighting, color, and/or other image properties associated with the specific camera and/or lens properties that are configured using the one or more tools. For instance, the editing system generates a first visualization of a 3D image by applying a first amount of blur to the 3D image data at different positions or depths in the 3D image in response to a selection of a first edit defined from properties of a first lens that is associated with a first number of glass elements, a first iris shape, a first number of blades, a first rolloff, and/or a first amount of diffraction, and renders a second visualization of the 3D image by applying a different second amount of blur to the 3D image data at the different positions or depths in the 3D image in response to a selection of a different second edit defined from properties of a second lens that is associated with a second number of glass elements, a second iris shape, a second number of blades, a second rolloff, and/or a second amount of diffraction.

The editing system implements the realistic camera and lens effects by accurately modeling or calculating the affect that the selected camera and lens properties have at different positions (e.g., different vignetting at different image peripheries), depths (e.g., different blurring of closer and distant objects), on different materials (e.g., plastic, water, metal, wood, etc.), hyperspectral properties (e.g., ultraviolet intensity representative of the sun), and/or other data included with the 3D image data that is absent from two-dimensional ("2D") image data. Specifically, the editing system models or calculates how focus, sharpness, light, color, motion, and/or other properties of the 3D image data representing objects or surfaces at different distances are affected by different camera and/or lens properties, adjusts the 3D image data based on the modeling or calculations for selected camera and/or lens properties and the specified distances and/or positioning of the 3D image data in the 3D image, and renders the adjusted 3D image data to generate the image with the realistic camera and lens effects.

The editing system generates the realistic camera and lens effects for point clouds, 3D models constructed with meshes or polygons, and/or other 3D image formats that include the 3D positional or depth data necessary for the accurate calculation of the camera and lens effects. FIG. 1 illustrates an example point cloud 100 with non-uniformly distributed data points, 3D constructs, and/or 3D image data in accordance with some embodiments presented herein.

The data points of point cloud 100 differ from pixels of a two-dimensional ("2D") image, because certain regions of point cloud 100 have no data points, lower densities of data points, and/or higher densities of data points based on varying amounts of visual information that is detected, scanned, or created at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image have pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements. Values for the positional elements and/or non-positional elements of a particular point may be calculated from the return intensity of the light, laser, or signal reflecting off that particular point and returning to the scanning device.

The positional elements include coordinates within a 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point. In some embodiments, the positional elements may be defined for created data points.

The non-positional elements include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional elements store other measured or derived characteristics including the chrominance, hardness, translucence, reflectivity, luminance, metallic characteristics, roughness, specular, diffuse, albedo, index of refraction ("TOR"), and/or other properties from the imaged or created surface, feature, or object. In some embodiments, the non-positional elements directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

Each point cloud data point or 3D construct of the point cloud includes an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Figure 2:
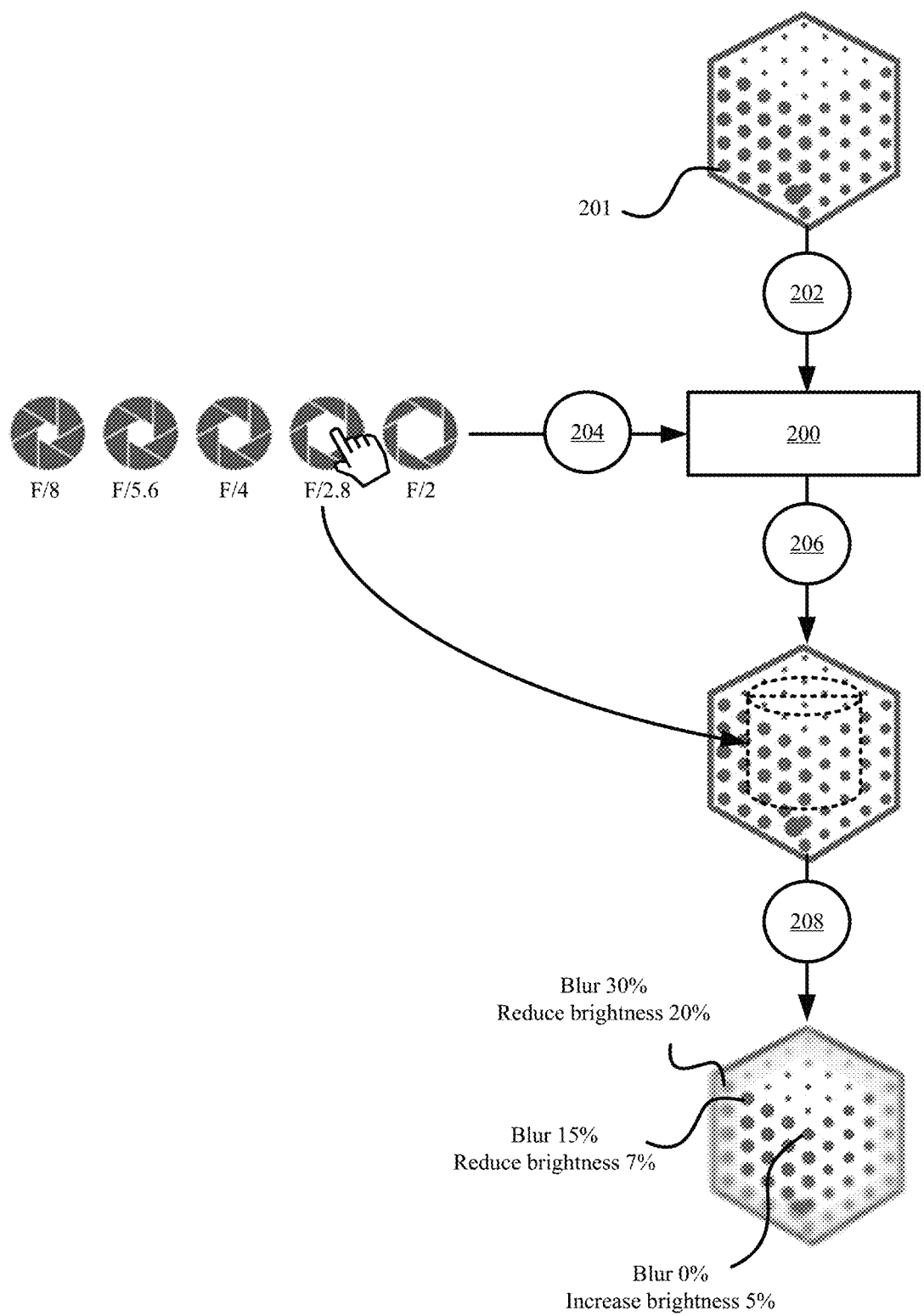
FIG. 2 illustrates an example of generating a realistic camera effect based on the depth data of point cloud data points in accordance with some embodiments presented herein.

FIG. 2 illustrates an example of generating a realistic camera effect based on the depth data of point cloud data points in accordance with some embodiments presented herein. Editing system 200 receives (at 202) point cloud 201 for postprocessing. Point cloud 201 is a 3D image that was digitally created or that was captured by a 3D camera or scanner with a particular camera sensor, camera settings, and lens.

Editing system 200 receives (at 204) an edit command to emulate the capture of the 3D image represented by point cloud 201 using a camera with a particular aperture setting. For instance, the edit command specifies rendering the 3D image data of point cloud 201 from a new depth-of-field ("DoF") associated with a particular F-stop. To simplify the discussion of FIG. 2, the edit command is defined for a single camera setting (e.g., the particular F-stop) and with the assumption that the camera lens used to generate or capture the 3D image does not change when specifying the different F-stop at which to render the postprocessed image. Moreover, the original 3D image may be associated with a default or first F-stop that may be recorded in the 3D image metadata. In some embodiments, the edit command may be defined as a combination of two or more camera settings (e.g., shutter speed, ISO, etc.), a combination of one or more camera settings and a selected camera sensor from different camera sensors (e.g., a full frame camera sensor or an Advanced Photo System type-C ("APS-C") cropped sensor) and/or manufacturers, or a combination of camera settings, a camera sensor, and camera lens.

Editing system 200 defines (at 206) the DoF at which to render the data points of point cloud 201 based on the particular F-stop. In some embodiments, the DoF is determined based on the positioning of a virtual camera in point cloud 201. The virtual camera defines the field-of-view and the set of data points to render. The DoF defines a subset of the set of data points from the image that are in focus if the scene represented by point cloud 201 was imaged or captured by a default camera and lens combination with the aperture setting set to the particular F-stop.

Editing system 200 adjusts (at 208) one or more of the positional and non-positional elements of the data points based on the positioning of the data points relative to the DoF or the virtual camera configured with the particular F-stop. Adjusting (at 208) the one or more positional and non-positional elements includes simultaneously adjusting two or more of the focus, brightness, color, and other properties of the data points based on the positioning of the data points relative to the DoF and/or the virtual camera emulating a physical camera configured with the particular F-stop.

For instance, the virtual camera is defined with a shallow DoF when the edit command specifies a large F-stop (e.g., a low F-stop number of 1.4 to 5.6). In this instance, editing system 200 identifies a first set of data points that are within the shallow DoF and a second set of data points that our outside the shallow DoF. Editing system 200 applies a first adjustment that increases or retains the sharpness of the first set of data points and that blurs or increases the softness of the second set of points by a first amount that depends on the distance separating each data point of the second set of data points from the virtual camera and/or shallow DoF and a first sharpness falloff associated with the large F-stop. Moreover, the large F-stop allows a greater amount of light from the shallow DoF to reach the virtual camera than a smaller F-stop (e.g., a high F-stop number of 8 to 64) for a wider DoF. Accordingly, editing system 200 applies a second adjustment that increases the brightness and/or color saturation of the first set of points and that decreases the brightness and/or color saturation of the second set of points by a second amount that depends on the data point distance from the virtual camera and/or shallow DoF and a first brightness reduction associated with the large F-stop.

Alternatively, if the edit command is defined with a small F-stop (e.g., a high F-stop number of 8 to 64), editing system 200 selects a third set of data points that are within the wide DoF defined by the small F-stop and a fourth set of data points that our outside the wide DoF. Editing system 200 applies a different first adjustment that increases or retains the sharpness of the third set of data points and that blurs or increases the softness of the second set of points by a third amount that depends on the distance separating each data point of the third set of data points from the virtual camera and/or wide DoF and a second sharpness falloff associated with the small F-stop. The first amount defined for the first adjustment of the first and second sets of data points is larger than the third amount defined for the first adjustment of the third and fourth sets of data points because the shallow DoF associated with the large F-stop creates greater blurring of the image data outside the shallow DoF than the wide DoF associated with the small F-stop. Additionally, editing system 200 applies a different second adjustment that increases the brightness and/or color saturation of the first set of points and that decreases the brightness and/or color saturation of the second set of points by a fourth amount that depends on the data point distance from the virtual camera and/or wide DoF and a second brightness reduction associated with the small F-stop. The second amount defined for the second adjustment of the first and second sets of data points is larger than the fourth amount defined for the second adjustment of the third and fourth sets of data points because the shallow DoF associated with the large F-stop creates a greater variation in the amount of light that data points inside and outside the shallow DoF are captured and/or rendered with than the wide DoF associated with the small F-stop.

In some embodiments, editing system 200 uses different images that were captured with different F-stops to train a neural network and generate a model for the different adjustments and quantity of the adjustments that are applied to different parts of a scene when capturing that scene with different F-stops. For instance, editing system 200 obtains different images that were captured with different F-stops, analyzes the images to determine differences between the images, generates a model based on the analysis for the different adjustments that were applied with different amounts at different regions of the images captured with the different F-stops, and applies the specified amount of adjustment that is associated with each data point position in the model. In some other embodiments, editing system 200 calculates an amount and angle of light reaching the virtual camera configured with the particular F-stop from different data points at their respective positions and depths in point cloud 201, and adjusts (at 208) the data point elements based on the calculated amount and light reaching the virtual camera sensor from each data point.

As shown in FIG. 2, the single edit command defined for a single camera setting or property (e.g., the F-stop) causes editing system 200 to edit two or more different attributes of image data or elements of the data points (e.g., sharpness, brightness, and color saturation). In other words, editing system 200 performs multiple different adjustments of the 3D image data to realistically generate the camera effect associated with capturing or viewing the represented scene with a desired aperture or F-stop without the user manually selecting and applying a first tool for a first adjustment (e.g., blurring) before selecting and applying at least a second tool for a second adjustment of the multiple different adjustments automatically performed by editing system 200 in response to the selection of the desired aperture or F-stop camera setting.

Moreover, changing the value of the single camera setting or property causes editing system 200 to dynamically select and apply the edit to different sets of data points (e.g., different data points falling within different DoFs that are defined relative to the camera setting value). Here again, editing system 200 saves the user from applying the different adjustment tools for blurring, brightness, etc. to a manually selected first set of data points when attempting to replicate a first camera effect associated with a first aperture setting, and applying the different adjustment tools to a manually selected different second set of data points when attempting to replicate a second camera effect associated with a second aperture setting. Instead, editing system 200 automatically and accurately identifies the different sets of data points that are adjusted to replicate different camera effects associated with different settings.

Accordingly, the edit command to adjust the DoF based on the particular F-stop differs from existing editing tools and operations. For instance, an independent blur tool exists for increasing or decreasing the sharpness or softness of image data. However, the blur tool is directly applied to a set of user-specified or user-selected image data that is be edited, whereas the F-stop edit command is not directly applied to any user-specified or user-selected image data and is instead automatically applied based on the 3D positioning of 3D image data relative to a DoF defined by the F-stop edit command. Moreover, the blur tool does not automatically adjust the blur effect according to the distance or depth of the image data because the distance or depth information is not present and is not accounted for in the 2D image data. The F-stop edit command dynamically adjusts the effects that are applied to the 3D image data based on differing distances or depths associated with the 3D image data.

Figure 3:
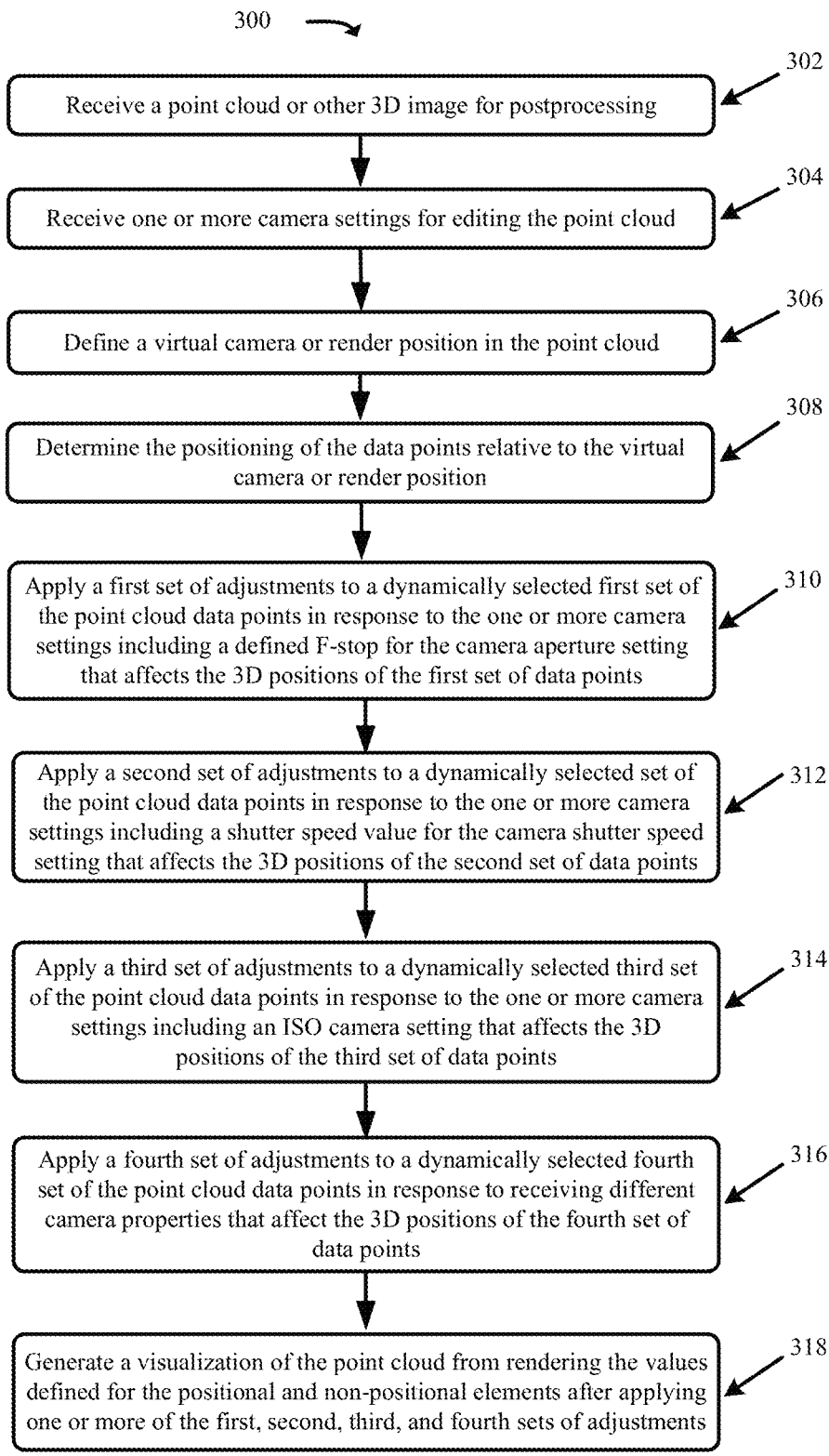
FIG. 3 presents a process for generating realistic camera effects by postprocessing 3D image data based on the selective application of emulated camera settings to 3D image data at different depths or positions in accordance with some embodiments presented herein.

FIG. 3 presents a process 300 for generating realistic camera effects by postprocessing 3D image data based on the selective application of emulated camera settings to 3D image data at different depths or positions in accordance with some embodiments presented herein. Process 300 is implemented by editing system 200. Editing system 200 includes one or more devices or machines with processing, memory, storage, network, and/or other hardware resources for the viewing, processing, editing, rendering, and/or other interaction with point clouds and other 3D images.

Process 300 includes receiving (at 302) a point cloud or other 3D image for postprocessing. Postprocessing an image includes adjusting or otherwise editing the image after it has been captured or generated. For instance, the image may be captured with a first set of camera settings and with a first lens, and postprocessing the image may include adjusting the image to render the image as if it was captured with a different second set of camera settings or with a second lens. The first set of camera settings and/or information about the first lens may be stored in the point cloud metadata. Similarly, the image may represent a digitally created environment that has no camera effects applied to it. For instance, the 3D image data at all depths may be in focus (e.g., have equal sharpness) and may be defined with unmodified visual characteristics that give the image an unrealistic perfect appearance. In this instance, the 3D image data may be associated with default camera setting values (e.g., F-stop of f/11 and a specific prime lens). Postprocessing the image may include adjusting the digitally created image to add photorealism by changing the uniformity of the image to more closely resemble the presentation of a scene through different lenses and camera settings.

Process 300 includes receiving (at 304) one or more camera settings for editing the point cloud. The one or more camera settings include the F-stop, the shutter speed, the ISO, and/or other configurable parameters that adjust camera focus, DoF, field-of-view, amount of light reaching the camera sensor, opening of the shutter, sensor sensitivity, etc. In some embodiments, the one or more camera settings include selecting between two or more different camera sensors that are associated with different light sensitivity, photosite arrangements, frame sizes, light capture technologies (e.g., a Charged Coupled Device ("CCD") or Complementary metal-oxide-semiconductor ("CMOS")), and other properties that affect focus, sharpness, color, brightness, and/or other image properties associated with capturing or imaging of a scene.

Process 300 includes defining (at 306) a virtual camera or render position in the point cloud. The virtual camera determines the angle, perspective, and position from which to render the 3D image data of the point cloud. Specifically, the virtual camera defines the field-of-view which determines the point cloud data points that are to be rendered in the postprocessed image and the positioning of those data points in the postprocessed image. In some embodiments, the position of the virtual camera within the point cloud is set based on user input. In some other embodiments, the position of the virtual camera is determined (e.g., at a default position) by editing system 200, or is preset in the point cloud.

Process 300 includes determining (at 308) the positioning of the data points relative to the virtual camera or render position. In some embodiments, editing system 200 calculates the distance or depth separating each data point from the virtual camera or render position.

Process 300 includes applying (at 310) a first set of adjustments to a dynamically selected first set of the point cloud data points in response to the one or more camera settings including a defined F-stop for the camera aperture setting that affects the 3D positions of the first set of data points. The F-stop controls the DoF. Increasing the F-stop number or value increases the DoF and decreases the amount of light entering the virtual camera. In some embodiments, editing system 200 calculates the first set of adjustments based only the one or more camera settings that are defined. In other words, editing system 200 calculates the first set of adjustments based on other camera settings and the camera lens being fixed or set to certain default values such that the first set of adjustments accurately and realistically represent the changes that occur when the same camera with the same lens captures a scene with the received (at 304) one or more camera settings changing from default or first values to modified second values.

Increasing the DoF causes more of the image or field-of-view to be in-focus and rendered sharply. Decreasing the amount of light entering the virtual camera causes the regions of the image that are further from the DoF to become darker as less light is captured from the regions that are further offset from the DoF.

Accordingly, applying (at 310) the first set of adjustments includes adjusting an amount of blur that is applied to the first set of data points based on their distance from the DoF (e.g., positioning relative to the DoF), and adjusting brightness of the first set of data points based on their distance from the DoF.

The amount of blur or softness that is applied decreases for data points that are positioned immediately outside the DoF and increases as the data points are positioned further from the DoF. Moreover, the amount of blur or softness that is applied to the data points varies depending on the F-stop of the aperture camera setting. For instance, editing system 200 applies a greater amount of blur to a data point that is a particular distance away from a DoF defined by a F-stop of f/2 than to a data point that is the same particular distance away from a DoF defined by a F-stop of f/8. The varying amount of blur associated with the different aperture setting values realistically replicates the blurring effect created from changing the aperture setting on a physical camera and models the manner with which light enters through different sized apertures.

In some embodiments, the amount of blur associated with the different aperture settings is calculated using one or more formulas. For instance, formula 1 is used to calculate the circle of confusion:

$$c = \frac{|S_2 - S_1|}{S_2} \frac{f^2}{N(S_1 - f)} \quad (1)$$

$S_1$ is the DoF or the focal distance (e.g., the distance at which a subject would be in perfect focus), $S_2$ is the actual distance to a data point, f is the focal length of the lens, and N is the F-stop for the camera effect being generated. $S_1$ is a computed value, and f may be fixed or set to a default value. The circle of confusion diameter (c) is then divided by the sensor frame size (another fixed or default value) in order to derive the blur diameter in coordinates.

In some embodiments, the amount of blur associated with the different aperture settings is modeled using a neural network. For instance, images of the same scene captured with the same conditions and same equipment but with different aperture settings are provided as training data to the neural network. The images may be labeled with the aperture setting used to capture that image and distances for different pixels represented in the images. The neural network uses different image recognition techniques to compare, differentiate, quantify differences in different image properties (e.g., sharpness, brightness, color deviation, etc.) captured in the different images. The neural network generates a model of these differences, and the model is used to replicate the image properties when different aperture settings are specified for the editing or postprocessing of an image. For instance, the analysis of the training data reveals that the F-stop of f/2 results in a 40% blurring and a 15% brightness reduction of objects that are a particular distance from the camera and/or DoF, and that the F-stop of f/8 results in a 5% blurring and a 3% brightness reduction of objects that are the particular distance from the camera and/or DoF. A model is generated with a connected set of synapses that associate the different adjustments for objects at different distances to the different aperture settings. Editing system 200 selects the model and the connected set of synapses defined for a particular aperture setting when that particular aperture setting is selected to edit a 3D image. Editing system 200 then applies the adjustments defined for a synapse that models an object at a particular distance from the camera or DoF when editing a data point or 3D image data that is the particular distance from the virtual camera or DoF defined in the 3D space of the point cloud or 3D image.

In some embodiments, blurring the data points includes decimating the data points and rendering fewer and fewer data points in planes that are farther away from the DoF or virtual camera. For instance, adjusting the amount of blur may include rendering a first set of data points that are positioned in the DoF to retain sharpness and focus on the first set of data points, rendering a first percentage of a second set of data points that are immediately outside the DoF to blur or soften the rendering of the second set of data points by a first amount, and rendering a lesser second percentage of a third set of data points that are furthest from the DoF to blur or soften the rendering of the third set of data points by a second amount that is greater than the first amount.

The brightness adjustment that is applied decreases for data points that are positioned immediately outside the DoF and increases as the data points are positioned farther from the DoF. In some embodiments, adjusting the brightness of the data points includes adjusting the values for the RGB color components or non-positional elements of the data points.

The first set of adjustments accurately recreate the effect of changing the F-stop because the blur and brightness adjustments are applied to individual data points based on their respective depth or distance relative to the DoF or virtual camera position. In other words, data points that neighbor one another about the x and y planes and that are in vastly differing z planes will not receive the same blur or brightness adjustment.

Process 300 includes applying (at 312) a second set of adjustments to a dynamically selected set of the point cloud data points in response to the one or more camera settings including a shutter speed value for the camera shutter speed setting that affects the 3D positions of the second set of data points. The shutter speed controls the exposure length.

A faster shutter speed decreases the amount of time the camera shutter is open which decreases the amount of light reaching the camera sensor. Decreasing the amount of light results in darker images and/or underexposed images. The exposure length also affects focus and/or color accuracy. For instance, a dark scene captured with a shorter exposure may become blurry or out-of-focus because insufficient light is captured to accurately define or differentiate the details in the dark scene. Also, a dark scene captured with a shorter exposure may have color bleeding or blending because insufficient light is captured to accurately differentiate between colors in the scene.

Accordingly, applying (at 312) the second set of adjustments includes adjusting the color values and/or brightness of the second set of data points based on their distance from the virtual camera or render position and the shutter speed value, and adjusting the amount of blur or blending that is applied to the second set of data points based on their distance from the virtual camera or render position and the shutter speed value. The second set of adjustments may be applied (at 312) in addition to the first set of adjustments when the F-stop and the shutter speed value are both defined as part of the one or more camera settings.

Adjusting the color values and/or brightness based on the shutter speed value includes determining the overall color distribution, luminosity, or brightness levels of the image (e.g., the point cloud data points), and classifying the point cloud as being dark, bright, or some increment in between light and dark. Adjusting the color values and/or brightness further includes determining the amount of light entering the virtual camera with the specified shutter speed value, comparing the overall color distribution, luminosity, or brightness levels of the image to the determined amount of light associated with the specified shutter speed value, increasing the values for the non-positional elements controlling the color or brightness of the data points in response to the color distribution, luminosity, or brightness levels being darker than the amount of light associated with the specified shutter speed value and the data point being closer to the virtual camera or render position, and decreasing the values for the non-positional elements controlling the color or brightness of the data points in response to the distribution, luminosity, or brightness levels being brighter than the amount of light associated with the specified shutter speed value and the data point being further from the virtual camera or render position. In some embodiments, each shutter speed value may be associated with a different amount of light or brightness level. In some such embodiments, the amount of light or brightness level associated with each shutter speed value may be adjusted based on other configured camera settings or properties such as the sensor size or sensor sensitivity. Depth or distance of the data points also affects the color or brightness adjustment because a camera sensor captures more color or light from closer objects than distant objects making the closer objects appear brighter than the distant object.

Adjusting the amount of blur or blending based on the shutter speed value includes comparing the overall color distribution, luminosity, or brightness levels of the image to the determined amount of light associated with the specified shutter speed value, and increasing or decreasing the amount of blur or blending based on the difference between the color distribution, luminosity, or brightness levels and the amount of light associated with the shutter speed setting and the distance of the data points from the virtual camera or render position. If the image is dark and the shutter speed setting is associated with limited light, then the amount of blur or blending is increased the more distant a data point is from the virtual camera or render position. With limited light, a camera sensor is unable to accurately differentiate between many colors which leads to the color blending and/or blurring of data points.

In some embodiments, editing system 200 stores and applies formulas to compute the second set of adjustments associated with the different shutter speed values. In some other embodiments, editing system 200 trains a neural network based on images of the same scene that are captured under the same conditions with different shutter speed values, and models the second set of adjustments for different shutter speed values that apply to data points at different distances or positions.

Process 300 includes applying (at 314) a third set of adjustments to a dynamically selected third set of the point cloud data points in response to the one or more camera settings including an ISO camera setting that affects the 3D positions of the third set of data points. The ISO camera setting provides another exposure control.

Applying (at 314) the third set of adjustments includes analyzing the density of the data points based on their positioning in the point cloud, adjusting the graininess or noise of the data points based on the ISO value and the density, and adjusting the brightness of the data points based on the ISO value and the distance of the data points from the virtual camera or render position.

In some embodiments, each ISO setting is associated with a different amount of graininess or noise that is modeled by training a neural network with sample images of the same scene taken using different ISO settings. An ISO value of 1600 is associated with the greatest amount of noise, whereas an ISO value of 100 is associated with the least amount of noise or no noise.

The data point density corresponds to a level of graininess or noise. For instance, a point cloud with a highly dense distribution of data points appears very detailed and sharp, whereas a point cloud with a low density of data points will be appear spotty, patchy, and/or include other noise elements. Accordingly, increasing the graininess or noise of the data points may include decimating or lowering the density of the data points to match the amount of graininess or noise associated with the ISO setting, and decreasing the graininess or noise may include adding new data points into the point cloud to increase the density and sharpness of the resulting rendered image.

In some embodiments, adjusting the graininess or noise includes adjusting the size of different data points in the point cloud. For instance, decreasing the graininess or noise includes setting and rendering the data points to be of equal size, and increasing the graininess or noise includes setting and rendering more of the data points with different sizes to create the spottiness, grain, or noise associated with higher ISO values.

Process 300 includes applying (at 316) a fourth set of adjustments to a dynamically selected fourth set of the point cloud data points in response to receiving different camera properties that affect the 3D positions of the fourth set of data points. The different camera properties correspond to different camera sensors, sensor sensitivity, and/or sensor sizes. Cameras from different manufacturers using different camera sensors produce different results and capture color and light differently. Accordingly, applying (at 316) the fourth set of adjustments includes emulating or recreating the color and light differences associated with the different camera sensors, sensor sensitivity, and/or sensor sizes. In some embodiments, editing system 200 trains a neural network based on images of the same scene that are captured under the same conditions using different camera sensors. The neural network determines differences in the images produced by the different camera sensors, and generates a model for the color, brightness, quality, and/or other variations between the camera sensors that are applied (at 316) as the fourth set of adjustments.

For instance, a first sensor with large photosites may accurately capture color of objects that are a threshold distance from the camera configured with a specific lens, whereas a second sensor with small photosite may distort the color of objects that are the threshold distance from the camera with the specific lens by a calculated amount. Applying (at 316) the fourth set of adjustments in response to postprocessing the point cloud to emulate the imaging of the second sensor includes identifying the fourth set of data points that are at least the threshold distance from the virtual camera, and distorting the color values of the fourth set of data points by the calculated amount.

Process 300 includes generating (at 318) a visualization of the point cloud (e.g., a postprocessed image) from rendering the values defined for the positional and non-positional elements after applying one or more of the first, second, third, and fourth sets of adjustments. In some embodiments, editing system 200 includes a user interface that generates a live preview of the rendered image after the camera effect associated with each defined camera setting is applied, and provides tools for adjusting the camera settings and/or direct editing of the rendered image.

The visualizations generated (at 318) by editing system 200 produce realistic effects that mirror those created by physical cameras and physical lenses. The realistic effects improve image quality relative algorithmic postprocessing techniques and/or filters.

For instance, many digital cameras produce an algorithmic bokeh effect by identifying a subject-of-interest in an image, and blurring everything around the subject-of-interest either uniformly or with an increasing amount of blur applied to pixels that are further removed from the subject-of-interest. The subject-of-interest is typically found at the image center and/or is refined based on the shape of a human head or body. In any case, the blurring created by the algorithmic bokeh effect does not account for the distance or positioning of the image data surrounding the subject-of-interest. Accordingly, the algorithmic bokeh effect provides an equal amount of blur to two neighboring pixels in an image that represent objects in vastly different z planes.

Figure 4:
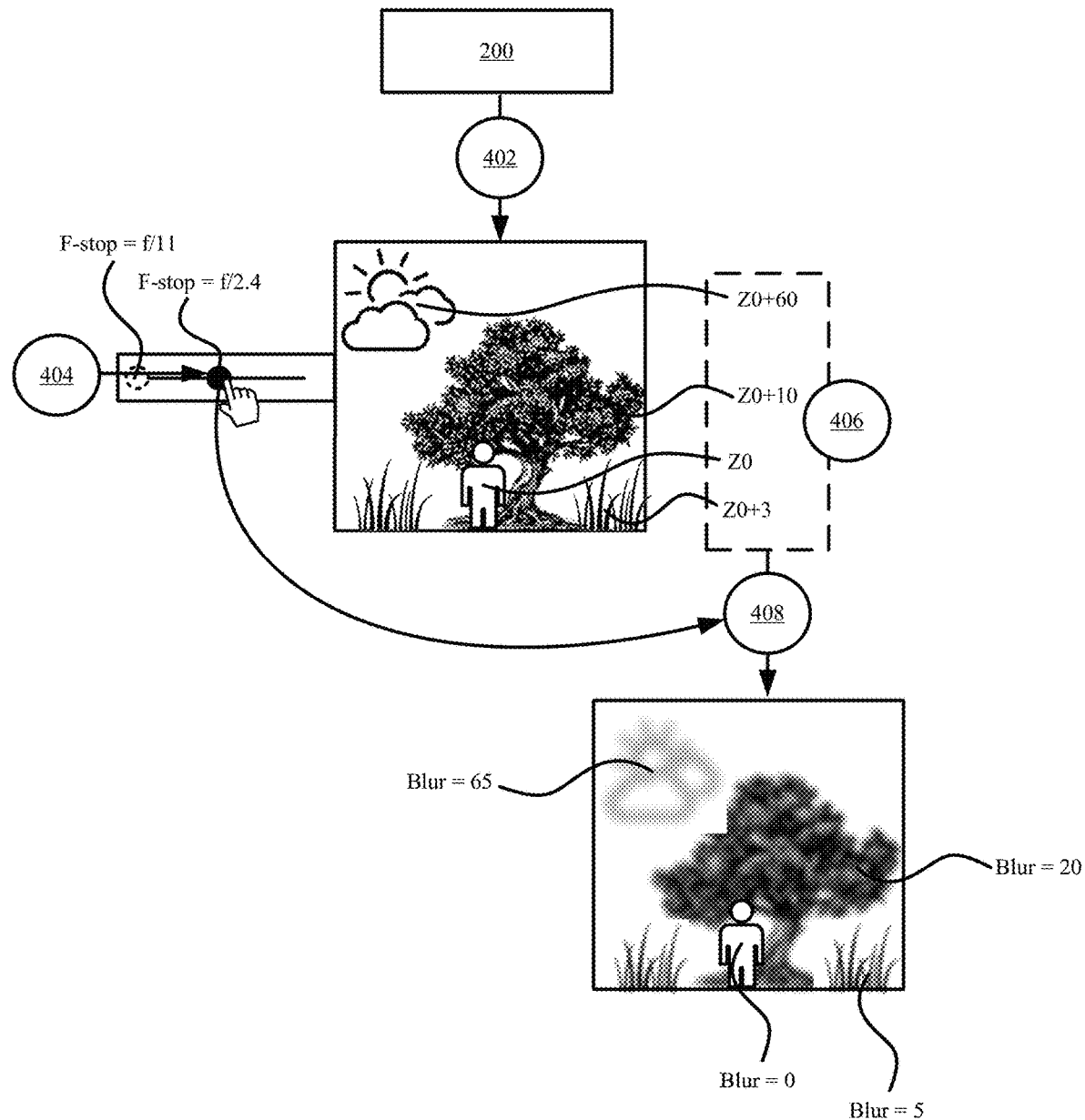
FIG. 4 illustrates an example of generating a realistic bokeh effect by adjusting blur based on actual depth or distance of 3D image data in accordance with some embodiments presented herein.

Conversely, editing system 200 produces a realistic bokeh effect by accounting for the depth or 3D positioning of the data points or 3D image data, and by adjusting the amount of blur applied to each data point or 3D image data based on the distance or depth separating each data point or 3D image data from data points or 3D image data representing the subject-of-interest. FIG. 4 illustrates an example of generating a realistic bokeh effect by adjusting blur based on actual depth or distance of 3D image data in accordance with some embodiments presented herein.

Editing system 200 renders (at 402) a first visualization of a point cloud based on actual values defined for the positional and non-positional elements of the point cloud data points. The first visualization results in an image that is entirely in-focus. The user interface presenting the first visualization includes a slider or other interactive elements for activating and/or applying a realistic bokeh effect to the image. The slider controls the bokeh strength and/or intensity. Each value of the slider corresponds to one or more different camera settings. For instance, moving the slider to increase the bokeh strength and/or intensity corresponds to enlarging the F-stop.

Editing system 200 detects (at 404) a user interaction with the slider that activates the realistic bokeh effect and that specifies the intensity of the bokeh effect via an F-stop setting. Editing system 200 selects the set of data points for the subject-of-interest, and analyzes (at 406) the 3D positioning or depth of the point cloud data points relative to 3D positioning or depth associated with the selected set of data points for the subject-of-interest.

Editing system generates (at 408) the realistic bokeh effect based the amount of blur associated with the selected F-stop and the depth or distance of each data point in the first visualization. In particular, editing system 200 calculates the amount of blur to apply to each data point independently, or calculates a different amount of blur to apply to data points in different planes. Accordingly, two data points that are adjacent in the x and/or y planes of the image are blurred differently when the two data points are in different z planes or at different depths. This creates a realistic bokeh effect unlike the algorithmically generated bokeh effects that would blur the two adjacent points equally and increase the amount of blur the farther the pixels are from the center of the image regardless of the actual depth associated with the image data represented by the pixels.

In some embodiments, editing system 200 leverages additional point cloud data to generate the realistic camera and lens effects. For instance, the data points may include a non-positional element that defines the material property represented by that data point. The material properties may include metal, plastic, wood, rubber, liquid, gas, etc. Each material property may be associated with different motion, rigidity, elasticity, and/or other values that affect how data points defined with different material properties are rendered with different camera settings.

In some embodiments, the material property of a data point may be derived based on a combination of one or more other non-positional elements of the data point. For instance, the chrominance, reflectivity, and transparency non-positional elements of a data point may be used to determine if the data point represents a metal, liquid, gas, or other material.

Figure 5:
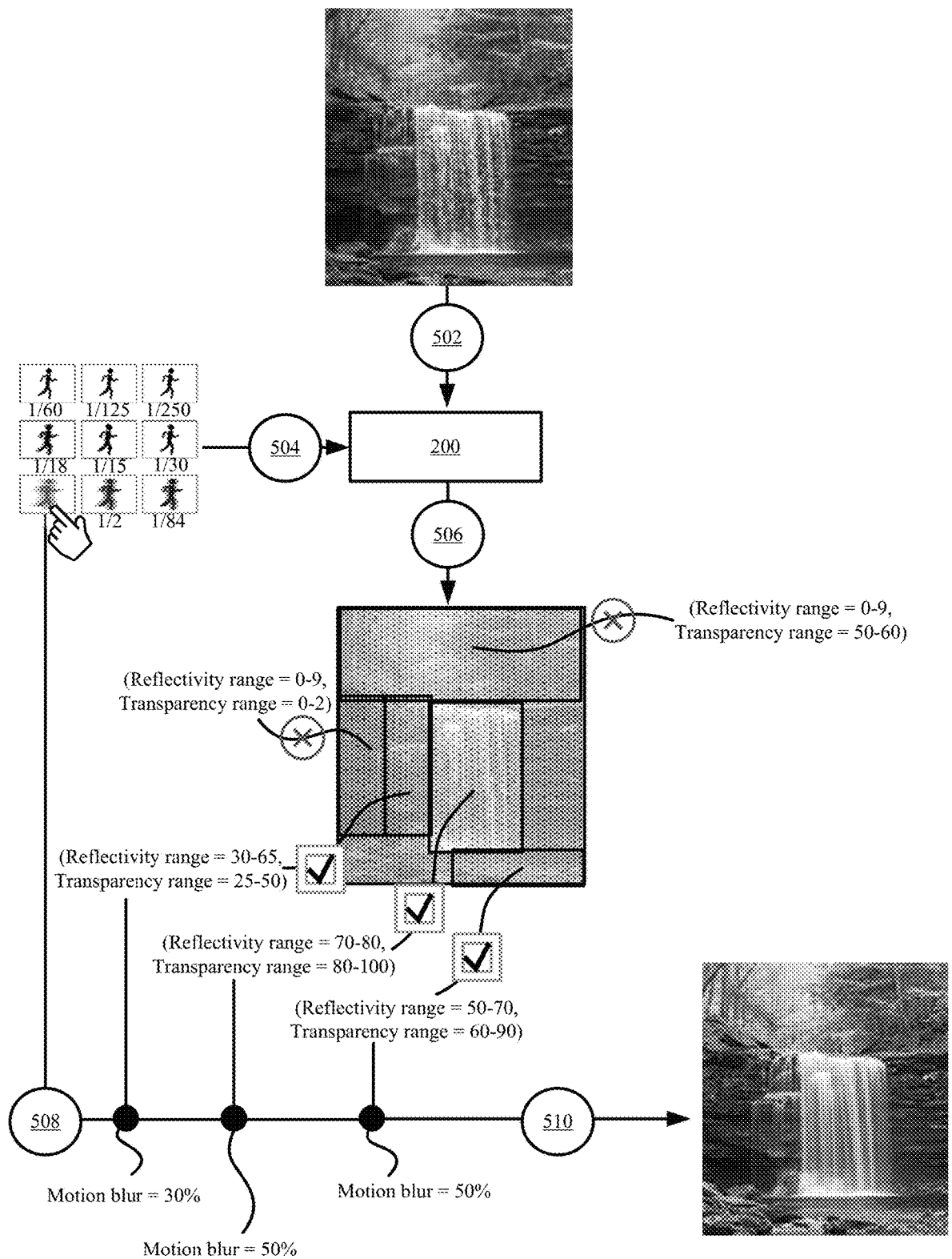
FIG. 5 illustrates an example of generating realistic camera and lens effects based on a material that is determined from the non-positional elements of the 3D image data in accordance with some embodiments presented herein.

FIG. 5 illustrates an example of generating realistic camera and lens effects based on a material that is determined from the non-positional elements of the 3D image data in accordance with some embodiments presented herein. Editing system 200 obtains (at 502) a point cloud with data points that include non-positional elements defining the reflectivity and transparency of the data points.

Editing system 200 receives (at 504) an edit command for postprocessing the point cloud with a long duration exposure camera setting. For instance, the camera setting associated with the edit command specifies a shutter speed of one second.

Editing system 200 analyzes (at 506) the non-positional elements of the data points to identify a set of data points that represent water or a liquid (e.g., a non-solid or moving material). For instance, the set of data points that represent water or liquid may include reflectivity and transparency non-positional elements with a specific range of values, reflectivity and transparency values that satisfy a threshold associated with a liquid material property, or may include a material property non-positional element with a value set to water or liquid.

Editing system 200 calculates (at 508) an amount of motion blur that is generated with the shutter speed camera setting of one second. In some embodiments, editing system 200 may use one or more artificial intelligence and/or machine learning ("AI/ML") techniques to compare images of the same scene that are captured with different shutter speed settings in order to model the amount of blur that is associated with each shutter speed setting. In some other embodiments, editing system 200 is configured with a different amount of blur for each shutter speed setting and for data points with different combinations of the reflectivity and transparency values. For instance, data points representing deep water or fast moving water may have larger reflectivity values and smaller transparency values than data points representing shallow water or slow moving water. Editing system 200 may refine the modeling of the motion blur associated with each shutter speed setting to account for additional factors that affect the motion blur and that are encoded in the data point elements. For instance, the blur model generated for each shutter speed setting may be adjusted to increase the blur associated with the reflectivity and transparency values representing fast moving water and to decrease the blur associated with the reflectivity and transparency values representing slow moving water.

Editing system 200 renders (at 510) a visualization of the point cloud with different amounts of motion blur associated with a one second shutter speed and different qualities of water applied to the set of data points. For instance, the subset of the set data points with reflectivity and transparency values representing slow moving water are blurred less than the subset of the set of data points with reflectivity and transparency values representing fast moving water. In some embodiments, applying the motion blur to the set of data points includes decimating the set of data points, changing a size at which the set of data points are rendered, adjusting the positional elements, and/or blending the color values of the set of data points so that they appear to overlap with one another.

Different camera lenses also affect image properties and/or image quality during the capture of a scene. For instance, the number of elements in a lens, the curvature of the elements (e.g., spheric, aspheric, double aspheric, biconcave, biconvex, planoconcave, planoconvex, meniscus positive or negative, etc.), the material of the elements (e.g., glass, plastic, etc.), the iris shape, the number of blades, the adhesive joining the elements, the focal length, and/or other properties of the lens affect the transfer of light to the camera sensor.

The lens properties may create spherical aberrations, coma, astigmatism, curvature of field, distortion, and/or other aberrations. The lens properties and/or created aberrations may affect illumination, rolloff, vignetting, halation, blooming, and diffraction which may cause subtle or even large changes in the capture of color (e.g., color fringing resulting in the light or dark edges), brightness (e.g., brightness distribution over an image), contrast (due to stray light or internal reflections inside the lens), sharpness, and/or other image properties.

Different lenses may have different coatings for reducing glare, ghosting, flare effects, or to filter certain wavelengths or color (e.g., ultraviolet light filters). These coatings further affect the capture of the image.

Different lenses or the focal length associated with different lenses change the presentation of foreground and background image data by changing the DOF. For instance, longer focal length lenses flatten or compress the z distance by bringing the image data in the foreground, middle, and background closer together. Accordingly, since the point cloud stores the depth information for each data point, editing system 200 is able to realistically apply the lens effects during postproduction.

Editing system 200 provides one or more tools or controls for configuring different lens properties or lens effects to apply in addition to or in place of the camera settings or camera effects during the postprocessing of a 3D image. The applied lens properties to a point cloud or other 3D image emulate or recreate the lens effects when editing or postprocessing an image by accounting for the distortions, variations, and flattening that different lenses or focal lengths associated with different lenses have on 3D image data at different 3D positions or depths, with different material properties, and/or specific combinations of non-positional element values.

Figure 6:
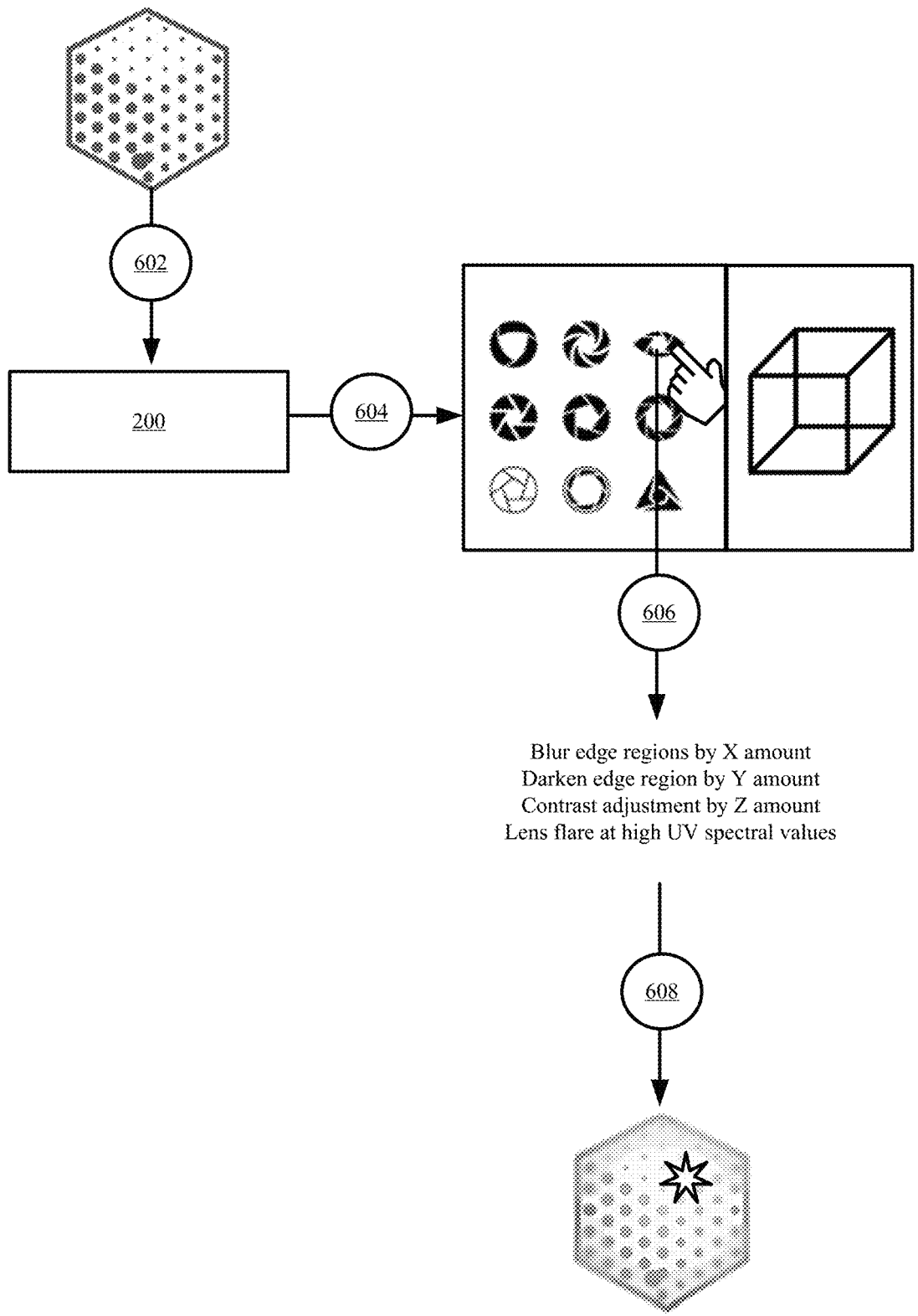
FIG. 6 illustrates an example of adjusting a 3D image during postprocessing with a lens effect in accordance with some embodiments presented herein.

FIG. 6 illustrates an example of adjusting a 3D image during postprocessing with a lens effect in accordance with some embodiments presented herein. Editing system 200 receives (at 602) a point cloud that has been digitally created or that has been created as a result of scanning a scene with a 3D camera or scanner. In other words, the received (at 602) 3D image data was created with no lens effect or was captured with a specific lens that created a first lens effect which will be changed during postprocessing so that the 3D image data is rendered with a different second lens effect.

Editing system 200 generates (at 604) a user interface that presents a first visualization of the point cloud and a set of interactive elements for selecting a lens effect to apply to the point cloud and/or rendered image. The first visualization is an image that is rendered based on the original or unadjusted positional and non-positional values of the point cloud data points.

A user defines a specific lens effect to apply to the point cloud. For instance, the user selects a specific lens make and model from the user interface. The specific lens make and model creates a desired lens effect because of one or more of the number of elements in the lens, the curvature of the elements, the material of the elements, the iris shape, the number of blades, the adhesive joining the elements, the focal length, and/or other properties of the selected lens. In some embodiments, editing system 200 simplifies the lens effect selection by providing lens effects that are associated with different types of lenses such as a wide-angle lens, a fish-eye lens, a telephoto lens, a prime lens, a macro lens, etc.

In some embodiments, editing system 200 uses one or more AI/ML techniques to differentiate the lens effects created by different lenses by performing a supervised machine learning over a sample set of images that capture the same scene under the same conditions using different lenses and that are labeled with the make and model of the lens used to capture that image. In some other embodiments, editing system 200 is configured with the lens effects associated with each of a set of available lenses that the user may select from using the user interface. For instance, an artist may define the lens effects associated with different lenses, and the defined lens effects may be entered into a reference database and linked to different identifiers for the different lenses. The lens effect definition may specify regions of the image that are affected by the lens effect, the changes to those regions (e.g., blurring, darkening, distorting, rotating, offsetting, etc.), and the quantity associated with each change at each region. In still some other embodiments, the user customizes the lens effect by constructing a virtual lens using the user interface. For instance, the user combines different lens elements (e.g., emulated glass or plastic elements with different curvatures) to create the virtual lens with each selected lens element being associated with different light transfer characteristics.

Editing system 200 determines (at 606) the adjustments that are associated with the selected or defined lens effect. For instance, a first selected lens effect may create a first amount of vignetting around first edge regions of the image and a first type of blur or distortion, and a second selected lens effect may create a different second amount of vignetting around different second edge regions of the image and a second type of blur or distortion. As shown in FIG. 6, the user select a lens with a specific iris shape that causes blurring and darkening of the image edge regions by different amounts, a whole image contrast adjustment, and a lens flare to occur at or around data points that are defined with a specific range of ultraviolet spectral values for one or more non-positional elements. For instance, the selected lens may lack an ultraviolet or polarization filter and is defined to emulate a lens flare for a strong light source that is identified by the ultraviolet spectral values, a concentration of bright data points, or a concentration of data points with specific RGB values in the image.

Editing system 200 applies (at 608) the lens effects to the point cloud data points, and adjusts one or more of the positional and non-positional elements of the data points based on the adjustments associated with the selected lens effect, the positioning of the data points, and/or the non-positional element values of the data points. For instance, editing system 200 analyzes the positional elements of the data points, applies the vignetting associated with the selected lens effect by blurring a first set of data points positioned at the edge regions by a first amount and by darkening the first set of data points by a second amount, analyzes the non-positional elements of the data points, applies the contrast change associated with the selected lens effect by increasing or decreasing the contrast of the entire image by a third amount, and introduces a lens flare to a second set of data points with non-positional element values representative of a bright light source (e.g., ultraviolet spectral values in a specific range).

Editing system 200 updates the user interface by rendering the 3D image with the applies lens effect. For instance, editing system 200 renders the point cloud data points after the first set of data points are blurred and darkened, all data points receive a contrast adjustments, and the second set of data points are modified with a lens flare effect in response to different adjustments defined for the selected lens effect and the respective positional and non-positional elements of the point cloud data points.

Figure 7:
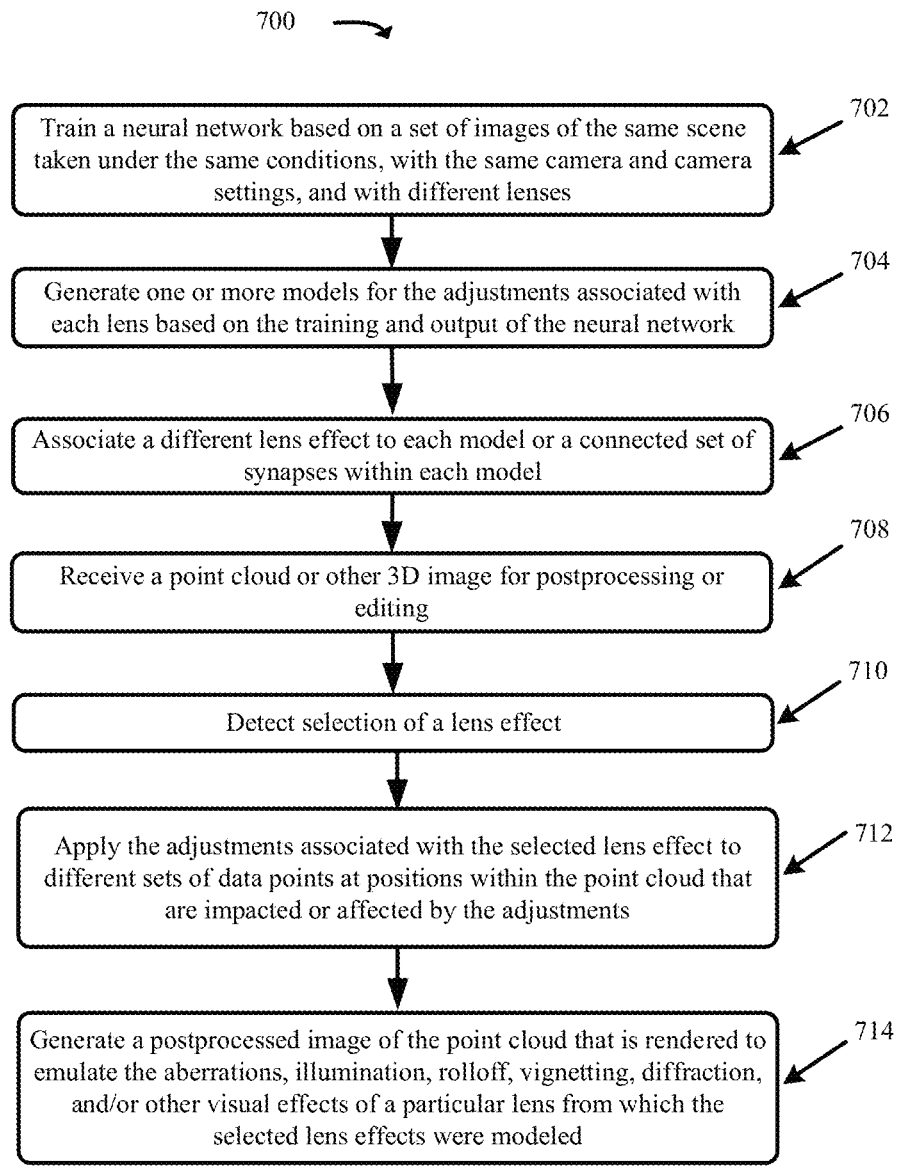
FIG. 7 presents a process for generating realistic lens effects to recreate different creative and/or artistic characteristics that different lenses impart on an image during the postprocessing of the image in accordance with some embodiments presented herein.

FIG. 7 presents a process 700 for generating realistic lens effects to recreate different creative and/or artistic characteristics that different lenses impart on an image during the postprocessing of the image in accordance with some embodiments presented herein. Process 700 is implemented by editing system 200.

Process 700 includes training (at 702) a neural network based on a set of images of the same scene taken under the same conditions, with the same camera and camera settings, and with different lenses. Each image of the set of images may be labeled with an identifier for the make and model or other identifying information of the different lens that was used to capture that image.

In some embodiments, training (at 702) the neural network includes performing an automated image analysis to detect differences at different parts of the images, classify the differences to one or more adjustments (e.g., blur, brightness, noise, vignetting, distortion, color adjustment, etc.), and quantify the classified differences. For instance, the neural network automatically detects a first amount of blurring produced at the corners of a first image taken or labeled with an identifier of a first lens, and a second amount of blurring produced at the corners of a second image taken or labeled with an identifier of a second lens.

In some embodiments, different neural networks or AI/ML techniques are trained (at 702) to detect, classify, and quantify a different adjustment. For instance, a first neural network may perform a first image analysis to detect, classify, and quantify differences in brightness created at different parts of the images, and a second neural network may perform a second image analysis to detect, classify, and quantity differences in blur or distortion at different parts of the images.

Process 700 includes generating (at 704) one or more models for the adjustments associated with each lens based on the training (at 702) and output of the neural network. A generated (at 704) model may be defined with a connected set of synapses that quantify the different adjustments produced when imaging a scene with a particular lens. In some embodiments, each synapse models a particular adjustment that the particular lens produces in a given region of the image. For instance, a first synapse models the vignetting that occurs in the upper right region, a second synapse models the vignetting that occurs in the upper left region, a third synapse models the vignetting that occurs in the lower right region, a fourth synapse models the vignetting that occurs in the lower left region of an image, and a fifth synapse models a lens flare that is created for a bright light source in the image when captured with the particular lens. The model may have different numbers of connected synapses for different lens based on the different adjustments that are detected for different lens and/or where those adjustments were detected during the training stage.

Process 700 includes associating (at 706) a different lens effect to each model or a connected set of synapses within each model. Each lens effect is identified by a different identifier. The lens effect identifier may correspond to the name, year, make, model, and/or other descriptive string that identifies the lens that created the associated lens effect. For instance, a lens identifier may be defined as "CompanyA 1990 24-105 mm f/4-5.6 XYZ", and the associated (at 706) lens effect may include the one or more adjustments that were modeled for that specific lens by a particular connected set of synapses in the one or more models.

Process 700 includes receiving (at 708) a point cloud or other 3D image for postprocessing or editing. A user may select, upload, open, and/or otherwise access the file or the storage or network path where the point cloud is stored, and editing system 200 loads the point cloud into a user interface.

Process 700 includes detecting (at 710) selection of a lens effect. In some embodiments, editing system 200 generates a user interface for postprocessing or editing the point cloud. Included in the user interface are one or more controls for selecting amongst the lens identifiers for the different lens effects modeled by the neural network and that are available for editing the received (at 708) point cloud or other 3D image.

Process 700 includes applying (at 712) the adjustments associated (at 706) with the selected lens effect to different sets of data points at positions within the point cloud that are impacted or affected by the adjustments. Accordingly, editing system 200 retrieves the adjustments that were modeled for the selected lens effect, determines the positions, depths, and/or non-positional element values affected by each adjustment, analyzes the positional and non-positional elements of the data points, and applies (at 712) a particular adjustment to modify the positional and/or non-positional elements of a set of data points at the positions and/or depths modeled for that particular adjustment. Applying (at 712) the adjustments may include blurring, distorting, adjusting contrast, flattening, adjusting brightness, adjusting specific color ranges, adding noise, adding lens flares and specular highlights, changing focus, and/or editing other qualities of the image produced by the data points.

Process 700 include generating (at 714) a postprocessed image of the point cloud that is rendered to emulate the aberrations, illumination, rolloff, vignetting, diffraction, and/or other visual effects of a particular lens from which the selected lens effects were modeled. In this manner, editing system 200 is used to realistically recreate the creative or artistic effects of viewing a scene through different physical lens on a 3D model or representation of the scene.

In some embodiments, the lens effects may be customized by changing the elements within the modeled set of lens. In other words, editing system 200 models the lens effects produced by different lenses, but also the constituent elements within the lenses so that changing the constituent element may alter the overall lens effect.

Figure 8:
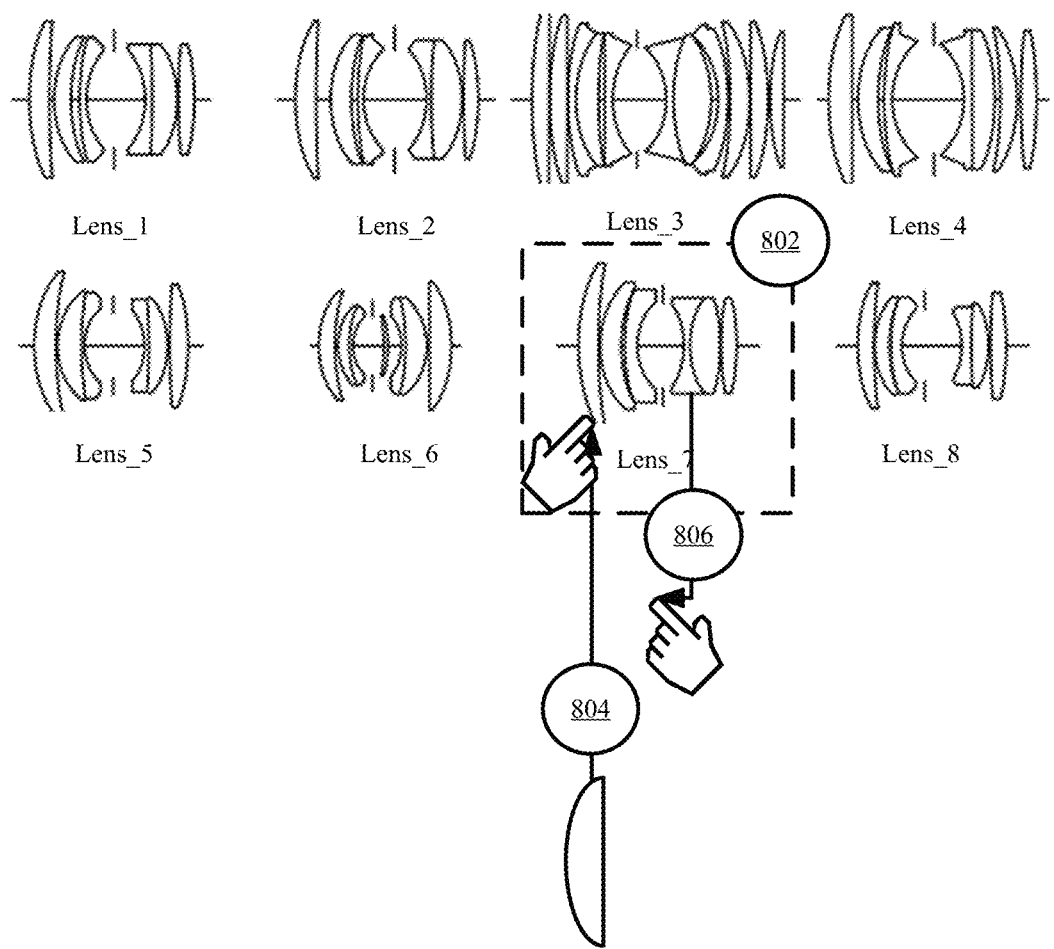
FIG. 8 illustrates an example of a customized lens effect in accordance with some embodiments presented herein.

FIG. 8 illustrates an example of a customized lens effect in accordance with some embodiments presented herein. Editing system 200 presents different lenses in a UI for selection. The aberration, illumination, rolloff, vignetting, diffraction, and/or other visual effects associated with each lens are modeled by editing system 200, and applied to an image when that lens is selected.

In some embodiments, each lens effect may be customized by the user. For instance, the user may select (at 802) a lens, and then change, adjust, or otherwise customize the elements associated with that selected lens. The customizations may include swapping (at 804) out a first or other elements from a selected lens with a second element or elements. The second element may adjust the overall lens effect based on differences in the modeled light transfer characteristics of the second element and the first element. Other customizations of the lens effect include adjusting the curvature, angle, coating, chemical compositions, thickness, material, manufacturing tolerances, and/or other properties of each individual element of a selected lens, or changing (at 806) the mounting or positioning of the elements within the selected lens. Editing system 200 models or calculates the light transfer characteristics of each element, and determines the overall lens effect produced by a selected and/or customized lens based on the modeling or calculations and the relative positioning of the elements, and adjusts an image according to the overall lens effect of the selected and/or customized lens.

The modeling of the lens effects may also capture the flattening that happens when imaging a scene with lenses having different focal length. Changing the focal length changes the DOF and/or the amount of flattening that is applied to the foregoing, middle, and background image data. Since the point cloud stores the depth positioning associated with each data point, editing system 200 realistically recreates the flattening and changing DOF associated with lenses of different focal lengths.

Figure 9:
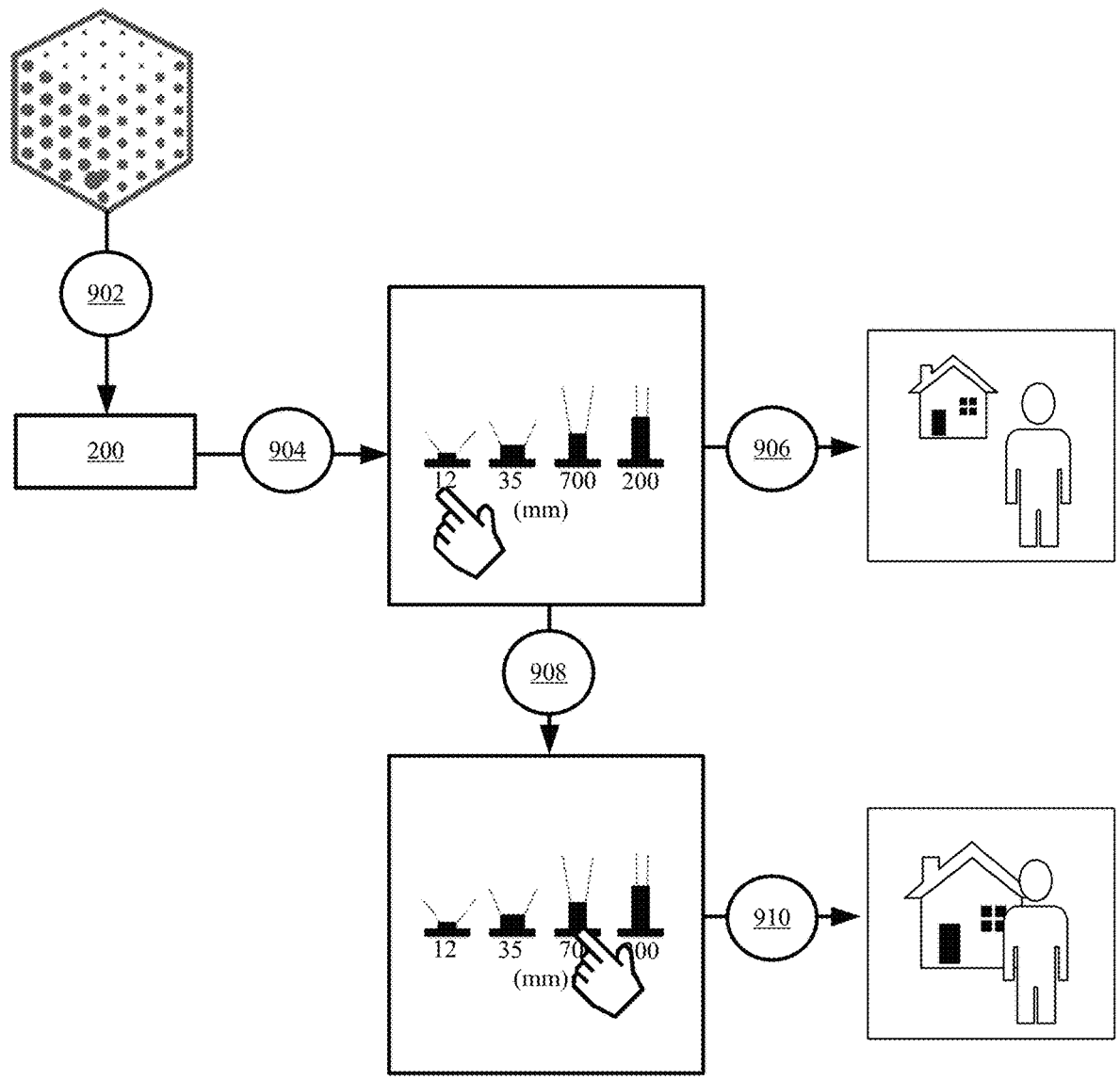
FIG. 9 illustrates an example of postprocessing a 3D image with different lens effects associated with different focal lengths in accordance with some embodiments presented herein.

FIG. 9 illustrates an example of postprocessing a 3D image with different lens effects associated with different focal lengths in accordance with some embodiments presented herein. Editing system 200 receives (at 902) a point cloud with data points distributed in a 3D space.

Editing system 200 receives (at 904) input for rendering the point cloud with a first lens effect associated with a first focal length. Editing system 200 determines a first DOF and a first amount of flattening that is applied to the image data in the first DOF based on the first focal length. In some embodiments, editing system 200 receives training data consisting of different images of the same scene captured under the same conditions with different focal lengths, and analyzes the training data in order to determine and/or quantity the amount the DOF and flattening changes between images of the same scene captured with different focal lengths. Editing system 200 generates (at 906) a first visualization from rendering the point cloud data points in the first DOF with the first amount of flattening.

Editing system 200 receives (at 908) input for rendering the point cloud with a second lens effect associated with a second focal length. Editing system 200 determines a second DOF and a second amount of flattening that is applied to the image data in the second DOF based on the second focal length. Editing system 200 generates (at 910) a second visualization from rendering the point cloud data points in the second DOF with the second amount of flattening. The second amount of flattening causes the data points in the foreground, middle, and background of the second DOF to appear closer together relative to the data points in the foreground, middle, and background of the first DOF. For instance, the foreground object (e.g., the set of data points representing the person and with z-coordinate values in a closer first set of planes) is presented at about the same size and position in the first visualization and the second visualization, whereas the background object (e.g., the set of data points representing the house and with z-coordinate values in a farther second set of planes) appears closer to the foreground object in the second visualization because of the different amount of flattening and DOF associated with change from the first focal length to the second focal length.

Figure 10:
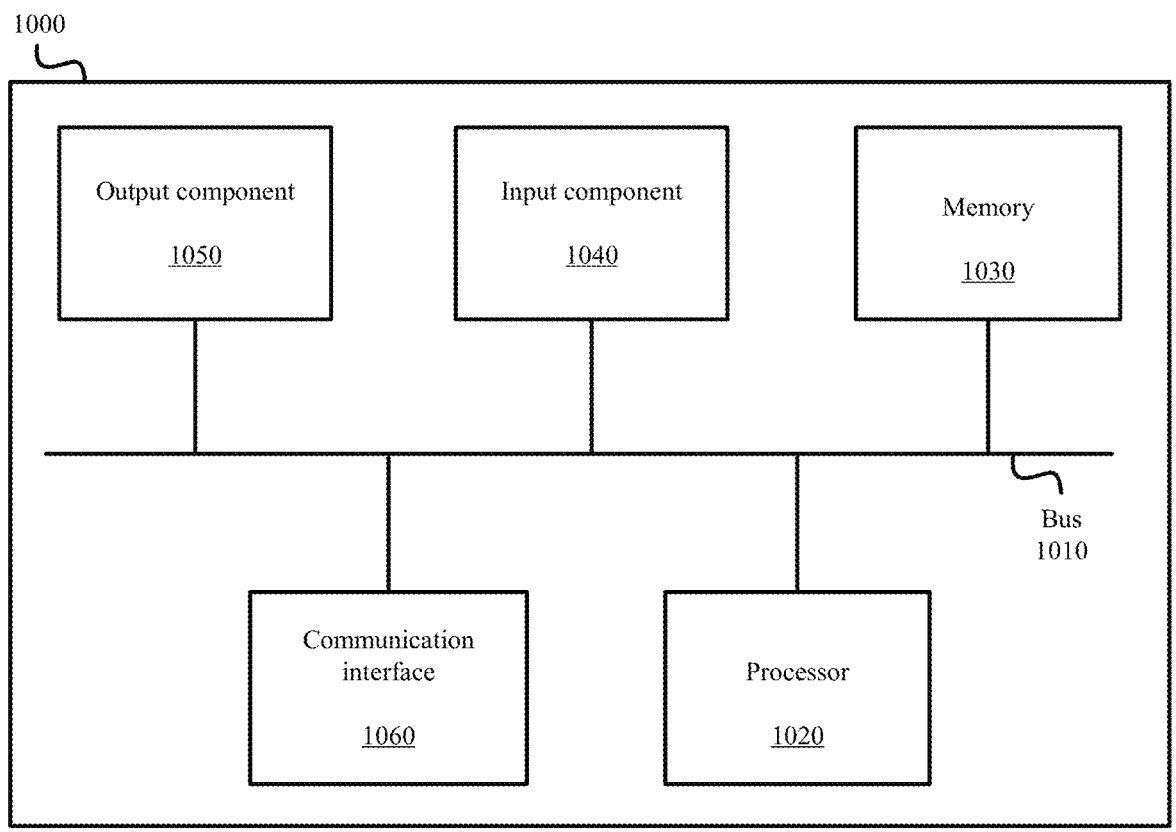
FIG. 10 illustrates example components of one or more devices, according to one or more embodiments described herein.

FIG. 10 is a diagram of example components of device 1000. Device 1000 may be used to implement one or more of the devices or systems described above (e.g., editing system 200). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a point cloud that is defined with a plurality of points that are disconnected from one another and distributed in a three-dimensional ("3D") space, wherein each point of the plurality of points is defined with positional data that defines a position of the point in the 3D space, and non-positional data that defines visual characteristics of the point at the position in the 3D space;
   selecting a first emulated camera setting from a plurality of emulated camera settings with which to render the point cloud;
   defining a first depth-of-field that extends from a position of a virtual camera in the 3D space to a first depth in the 3D space based on a first emulated configuration of the virtual camera with the first emulated camera setting;
   determining a first set of points from the plurality of points positioned within the first depth-of-field, and a second set of points from the plurality of points positioned outside the first depth-of-field; and
   applying different adjustments to one or more of the positional data or the non-positional data of the plurality of points based on the position of each point relative to the first depth-of-field, wherein applying the different adjustments comprises:
   increasing one or more of a brightness or color saturation of the first set of points based on the first set of points being positioned within the first depth-of-field; and
   increasing an amount with which the one or more of the positional data or the non-positional data of a specific point from the second set of points is adjusted based on a distance between the position of the specific point and the first depth-of-field, wherein increasing the amount comprises decreasing the one or more of the brightness or color saturation of the second set of points based on the distance between each point of the second set of points and the first depth-of-field.

2. The method of claim 1 further comprising:
   selecting a second emulated camera setting from the plurality of emulated camera settings;
   defining a second depth-of-field that extends from the position of the virtual camera in the 3D space to a second depth in the 3D space based on a second emulated configuration of the virtual camera with the second emulated camera setting; and
   applying a different second set of adjustments to the one or more of the positional data or the non-positional data of the plurality of points based on the position of each point relative to the second depth-of-field.

3. The method of claim 1,
   wherein applying the different adjustments further comprises blurring each particular point from the second set of points based on the distance between the position of the particular point and the first depth-of-field.

4. The method of claim 1,
   wherein applying the different adjustments further comprises sharpening the first set of points and blurring the second set of points.

5. The method of claim 4 further comprising:
   generating a modified point cloud in response to sharpening the first set of points in the first depth-of-field and blurring the second set of points outside the first depth-of-field.

6. The method of claim 1,
   wherein applying the different adjustments further comprises adding noise to the second set of points outside the first depth-of-field.

7. The method of claim 6, wherein adding noise to the second set of points comprises:
   modifying a size at which the second set of points are rendered relative to a size at which the first set of points are rendered.

8. The method of claim 6, wherein adding noise to the second set of points comprises:
   removing one or more points from the second set of points.

9. The method of claim 1 further comprising:
   determining that the first set of points have an x-coordinate value, a y-coordinate value, and a z-coordinate value that is within a first z-coordinate value for the position of the virtual camera and a second z-coordinate value associated with the first depth in the 3D space; and
   determining that the second set of points have an x-coordinate value, a y-coordinate value, and a z-coordinate value that is outside the first z-coordinate value for the position of the virtual camera and the second z-coordinate value associated with the first depth in the 3D space.

10. The method of claim 9, wherein applying the different adjustments further comprises:
adjusting the one or more of the positional data or the non-positional data of the first set of points by a first amount and the one or more of the positional data or the non-positional data of the second set of points by a different second amount.

11. The method of claim 9, wherein applying the different adjustments further comprises:
adjusting the one or more of the positional data or the non-positional data of each particular point of the second set of points by an amount defined based on a difference between the z-coordinate value of the particular point and the first z-coordinate value or the second z-coordinate value associated with the first depth-of-field.

12. The method of claim 1 further comprising:
setting the position of the virtual camera in the 3D space according to a user input.

13. The method of claim 1 further comprising:
training a neural network with images of a particular scene that are captured with each emulated camera setting of the plurality of emulated camera settings; and
determining different sets of adjustments that are associated with each emulated camera setting of the plurality of emulated camera settings based on differences detected between the images.

14. The method of claim 1 further comprising:
presenting a modified rendering of the point cloud in response to said applying the different adjustments.

15. The method of claim 1, wherein the emulated camera setting of the plurality of emulated camera settings corresponds to one or more of a different aperture F-stop, a different shutter speed, a different ISO value, or a different focal length.

16. An editing system comprising:
one or more hardware processors configured to:
receive a point cloud that is defined with a plurality of points that are disconnected from one another and distributed in a three-dimensional ("3D") space, wherein each point of the plurality of points is defined with positional data that defines a position of the point in the 3D space, and non-positional data that defines visual characteristics of the point at the position in the 3D space;
select a first emulated camera setting from a plurality of emulated camera settings with which to render the point cloud;
define a first depth-of-field that extends from a position of a virtual camera in the 3D space to a first depth in the 3D space based on a first emulated configuration of the virtual camera with the first emulated camera setting; and
determine a first set of points from the plurality of points positioned within the first depth-of-field, and a second set of points from the plurality of points positioned outside the first depth-of-field; and
apply different adjustments to one or more of the positional data or the non-positional data of the plurality of points based on the position of each point relative to the first depth-of-field, wherein applying the different adjustments comprises:
increasing one or more of a brightness or color saturation of the first set of points based on the first set of points being positioned within the first depth-of-field; and
increasing an amount with which the one or more of the positional data or the non-positional data of a particular point from the second set of points is adjusted based on a distance between the position of the particular point and the first depth-of-field, wherein increasing the amount comprises decreasing the one or more of the brightness or color saturation of the second set of points based on the distance between each point of the second set of points and the first depth-of-field.

17. The method of claim 1, wherein applying the different adjustments further comprises increasing the amount with which the one or more of the positional data or the non-positional data of the particular point is adjusted based on a density of points at the position of the particular point.

18. A method comprising:
receiving a point cloud that is defined with a plurality of points that are disconnected from one another and distributed in a three-dimensional ("3D") space, wherein each point of the plurality of points is defined with positional data that defines a position of the point in the 3D space, and non-positional data that defines visual characteristics of the point at the position in the 3D space;
selecting a first emulated camera setting from a plurality of emulated camera settings with which to render the point cloud;
defining a first depth-of-field that extends from a position of a virtual camera in the 3D space to a first depth in the 3D space based on a first emulated configuration of the virtual camera with the first emulated camera setting;
determining a first set of points from the plurality of points positioned within the first depth-of-field, and a second set of points from the plurality of points positioned outside the first depth-of-field; and
applying different adjustments to one or more of the positional data or the non-positional data of the plurality of points based on the position of each point relative to the first depth-of-field, wherein applying the different adjustments comprises:
increasing an amount with which the one or more of the positional data or the non-positional data of a particular point is adjusted based on a distance between the position of the particular point and the first depth-of-field; and
adding noise to the second set of points outside the first depth-of-field by removing one or more points from the second set of points.

19. An editing system comprising:
one or more hardware processors configured to:
receive a point cloud that is defined with a plurality of points that are disconnected from one another and distributed in a three-dimensional ("3D") space, wherein each point of the plurality of points is defined with positional data that defines a position of the point in the 3D space, and non-positional data that defines visual characteristics of the point at the position in the 3D space;
select a first emulated camera setting from a plurality of emulated camera settings with which to render the point cloud;
define a first depth-of-field that extends from a position of a virtual camera in the 3D space to a first depth in the 3D space based on a first emulated configuration of the virtual camera with the first emulated camera setting;

determine a first set of points from the plurality of points positioned within the first depth-of-field, and a second set of points from the plurality of points positioned outside the first depth-of-field; and apply different adjustments to one or more of the positional data or the non-positional data of the plurality of points based on the position of each point relative to the first depth-of-field, wherein applying the different adjustments comprises:

increasing an amount with which the one or more of the positional data or the non-positional data of a particular point is adjusted based on a distance between the position of the particular point and the first depth-of-field; and adding noise to the second set of points outside the first depth-of-field by removing one or more points from the second set of points.

\* \* \* \* \*